(12) United States Patent
Luo et al.

(10) Patent No.: US 11,603,786 B1
(45) Date of Patent: Mar. 14, 2023

(54) MICROWAVE ENHANCEMENT OF EXHAUST AFTERTREATMENT SYSTEMS

(71) Applicant: Southwest Research Institute, San Antonio, TX (US)

(72) Inventors: Yilun Luo, Ann Arbor, MI (US); Terry Alger, San Antonio, TX (US); Scott Hotz, Ann Arbor, MI (US); Christopher Suhocki, Battle Creek, MI (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/720,761

(22) Filed: Apr. 14, 2022

(51) Int. Cl.
*F01N 3/028* (2006.01)
*F01N 3/20* (2006.01)

(52) U.S. Cl.
CPC ............. *F01N 3/202* (2013.01); *F01N 3/028* (2013.01)

(58) Field of Classification Search
CPC .................................. F01N 3/028; F01N 3/202
See application file for complete search history.

(56) References Cited

U.S. PATENT DOCUMENTS

| | | | |
|---|---|---|---|
| 2003/0061791 A1* | 4/2003 | Barbier | F01N 3/028 55/282.3 |
| 2009/0217818 A1* | 9/2009 | Gonze | F01N 3/028 95/278 |

FOREIGN PATENT DOCUMENTS

| | | | | |
|---|---|---|---|---|
| DE | 102006041284 A1 | * | 3/2008 | ........... F01N 13/017 |
| DE | 102009054175 A1 | * | 5/2011 | ........... B01D 53/925 |
| DE | 102018213353 A1 | * | 2/2020 | |
| JP | 07127436 A | * | 5/1995 | ............. F01N 3/202 |
| JP | 2009036199 A | * | 2/2009 | ........... F01N 3/0275 |

OTHER PUBLICATIONS

Machine translation of DE-102009054175-A1, accessed Aug. 10, 2022. (Year: 2022).*
Machine translation of JP-2009036199-A, accessed Aug. 10, 2022. (Year: 2022).*
Machine translation of DE-102006041284-A1, accessed Aug. 10, 2022. (Year: 2022).*
Machine translation of DE-102018213353-A1, accessed Aug. 10, 2022. (Year: 2022).*

* cited by examiner

*Primary Examiner* — Jonathan R Matthias
(74) *Attorney, Agent, or Firm* — Livingston Law Firm

(57) ABSTRACT

A system for providing microwave energy to aftertreatment devices that treat the exhaust of an internal combustion engine. The system has a microwave generator and a transmission network for delivering the microwaves to one or more of the aftertreatment devices. The transmission network comprises a combination of solid and hollow waveguides. Antenna(s) transmit microwave energy into the working chamber the aftertreatment device(s), with at least one of the devices having antenna(s) capable of distributing microwave energy throughout its chamber.

14 Claims, 5 Drawing Sheets

MICROWAVE ENHANCEMENT OF EXHAUST AFTERTREATMENT SYSTEMS

TECHNICAL FIELD OF THE INVENTION

This patent application relates to vehicle emissions systems, and more particularly to a microwave system for enhancing emissions aftertreatment.

BACKGROUND OF THE INVENTION

Vehicles having internal combustion engines are equipped with various types of emissions aftertreatment systems. The exhaust stream moves from the engine to the aftertreatment system. These systems have one or more devices for reducing harmful exhaust emissions by cleaning exhaust gases to ensure the engines meet emission regulations. The specific devices used in the aftertreatment system vary depending on the type of engine.

For some engines, such as some spark ignition engines, a single three-way catalyst (TWC) can be sufficient to achieve significant reductions in pollutants. For other engines, such as lean burn diesel engines, a number of devices are required.

As an example of an aftertreatment system for a diesel engine, the exhaust stream first moves to a diesel particulate filter (DPF), which collects and oxidizes carbon to remove particulate matter. A diesel oxidation catalyst (DOC) aids in this process. After collecting particles from the exhaust in the DOC and DPF, the exhaust still contains nitric oxide and nitrogen dioxide (NOx). To reduce NOx levels, the exhaust is injected with urea and moves into a selective catalyst reduction device, which converts the NOx and urea mixture into nitrogen gas and water vapor.

An aftertreatment system may further have secondary systems to ensure the aftertreatment system operates as intended. These secondary systems can include systems to control exhaust gas composition through control of exhaust stoichiometry or through a supply of reactants not found in exhaust gas or not present in sufficient quantity, thermal management systems to ensure that aftertreatment devices operate within certain temperature ranges, and systems to ensure that contaminants and pollutants accumulating in aftertreatment devices are removed.

Thermal management can be achieved by using various implementation options. The options can be classified as active versus passive measures or engine-based versus exhaust-system-based measures. Conventional active exhaust-system-based measures include catalytic heaters, burners, and electric heaters.

DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to exhaust-system-based active thermal management for an exhaust aftertreatment system of an internal combustion engine. A Microwave Enhanced Aftertreatment (MEA) system transmits and couples microwaves to one or more aftertreatment devices. The microwave energy not only pre-heats the devices but also generate microwave fields within the device to enhance aftertreatment chemical reactions. Once coupled, microwaves inside the device create strong electric and magnetic fields which accelerate charged particles causing molecule-to-molecule collisions thus creating more charged particles. This reaction enhances chemical and thermal kinematics beneficial to the exhaust aftertreatment system.

The MEA system is suitable for any exhaust aftertreatment system, but is particularly suitable for exhaust aftertreatment systems for internal combustion engines. Vehicles equipped with exhaust aftertreatment systems are also equipped with the MEA system. As explained below, the MEA system provides many improvements that extend to hybrid vehicles.

Figure 1:
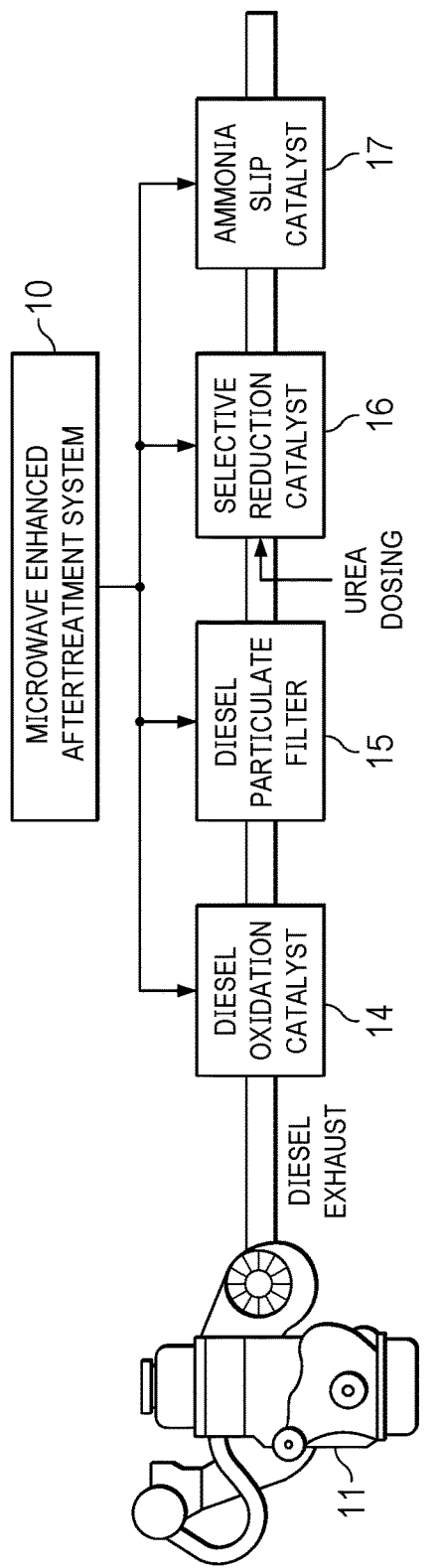
FIG. 1 illustrates an example embodiment of the microwave enhanced aftertreatment (MEA) system used with an exhaust aftertreatment system of a diesel engine.

FIG. 1 illustrates an example embodiment of the MEA system 10 used with an exhaust aftertreatment of a diesel engine 11. The aftertreatment system comprises a diesel oxidation catalyst (DOC) 14, a diesel particulate filter (DPF) 15, a selective reduction catalyst (SCR) 16, and an ammonia slip catalyst (ASC) 17. Any one or more of these aftertreatment devices may receive microwave energy from the MEA system 10. In the example of FIG. 1, each device receives microwave energy.

Figure 2:
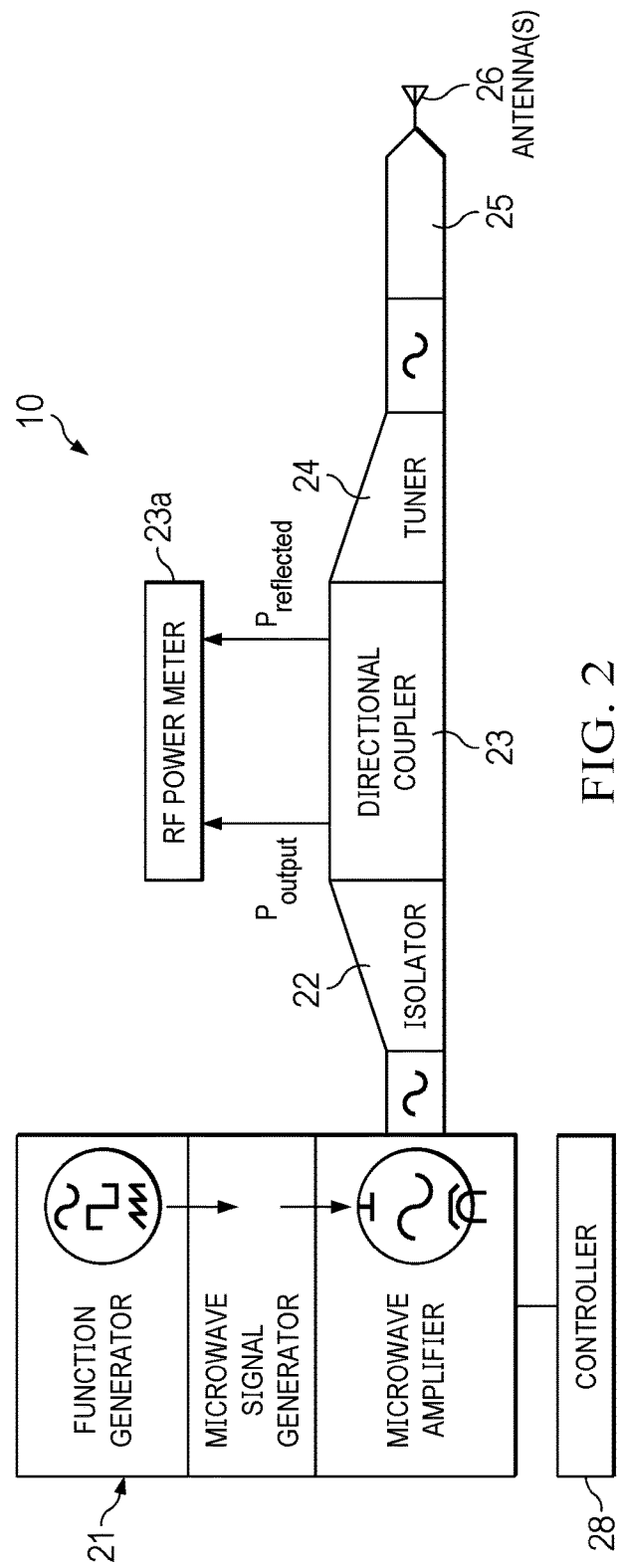
FIG. 2 illustrates the MEA system.

FIG. 2 illustrates the MEA system 10. The MEA system 10 comprises primarily of a microwave generator 21, transmission network 25, and microwave antenna(s) 26. Additional supplementary components are an isolator 22, a directional coupler 23 for a power meter 23*a*, and tuner 24.

Microwave generator 21 generates and amplifies high power microwave energy. An example of microwave energy output from MEA system 10 is 8-12 GHz. It is expected that the microwave power delivered to the aftertreatment devices may be in the 0 kw to 10 kW range.

A controller 28 controls the timing and duration of microwave signals. For aftertreatment systems in which microwaves are delivered to multiple devices, more sophisticated controls may be implemented, such as what aftertreatment devices receive microwaves and when, and the frequency and power of microwaves delivered. These controls may be implemented independently for each device, with transmission network 25 being designed to provide simultaneous or multiplexed signals. Controller 28 may be in communication with or integrated into a larger engine control system.

Transmission network 25 may be implemented with hollow and/or solid waveguides. Solid waveguides may include cables. A feature of the MEA system 10 is the delivery of high-power microwaves to multiple devices using a network suitable for high-power microwave transmission that will also withstand the chemicals and temperatures in an exhaust aftertreatment system.

The antenna(s) 26 to each device may be implemented as a single antenna or as multiple antennas. Microwave antenna designs include, but are not limited to, waveguide antennas, wire antennas, quarter wavelength antennas, patch antennas, near field antennas, and phase array antennas.

Transitions between transmission lines 25 and antennas 26 are particularly important to maintain high power microwave energy. Transitions must provide a smooth transition between waveguides and antennas, to achieve high transmission efficiency and low reflection for a wide operating frequency range, and to transmit high power microwave energy.

Figure 3:
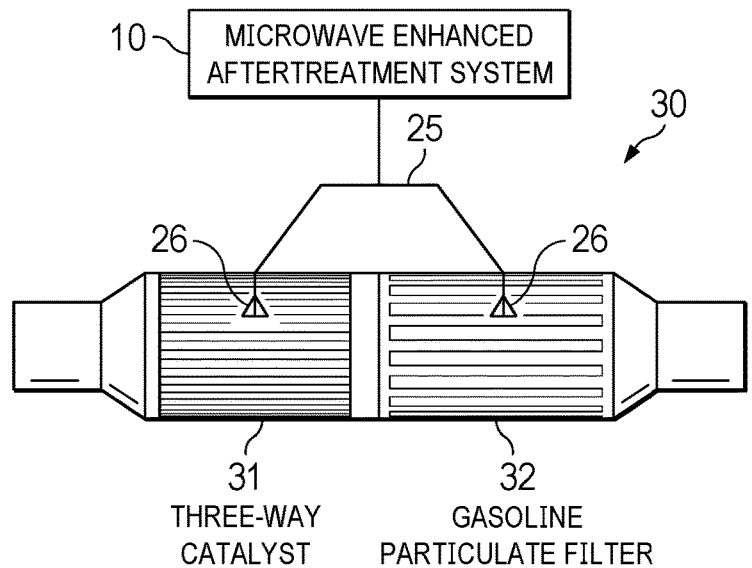
FIG. 3 illustrates the MEA system used with an exhaust aftertreatment system of a gasoline engine.

FIG. 3 illustrates MEA system 10 used for the exhaust aftertreatment of a gasoline engine. In this case, the aftertreatment devices comprise a three-way catalyst 31 and a gasoline particulate filter 32. MEA system 10 delivers microwaves via waveguide network 25 connected to at least one antenna to each device.

Antennas and Transitions

A factor in antenna choice is whether microwaves are desired in the near field of the antenna or broadcast to cover the entire interior of an aftertreatment device, or both. For purposes of this description, the interior of the aftertreatment device is referred to as its "chamber" and may be any kind of reaction chamber or filter.

Figure 4:
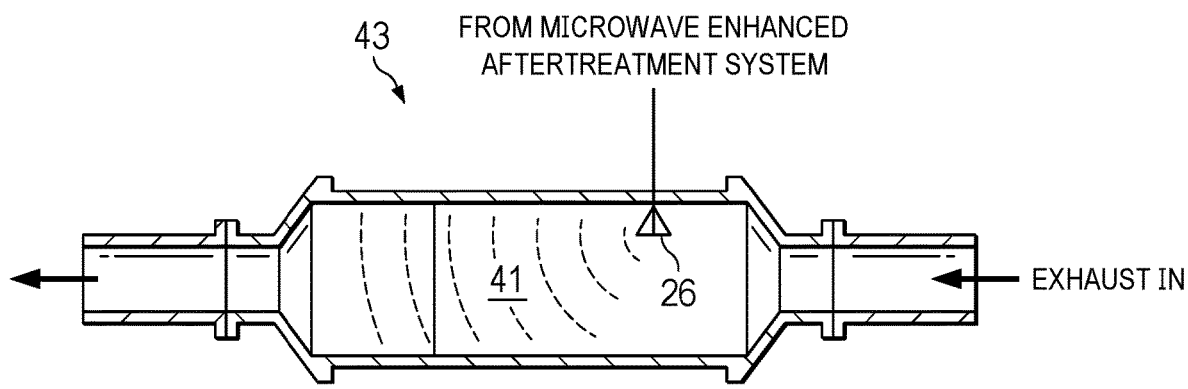
FIG. 4 illustrates the delivery of microwaves to the inner chamber of an aftertreatment device and the distribution of microwave energy throughout the entire chamber.

FIG. 4 illustrates the delivery of microwaves to the inner chamber 41 of an aftertreatment device 43 and the distribution of microwave energy throughout the entire chamber. The same concept applies to other aftertreatment devices, such that microwave energy is coupled to the entire chamber of an aftertreatment device. This generates microwave/RF plasma and ions. For catalytic aftertreatment devices especially, this enhances chemical reactions and improves aftertreatment efficiency for gases, such as NOx, carbon monoxide, hydrocarbons, and other greenhouse gases, as they are converted back to harmless gases such as nitrogen and water vapor.

In addition, transmitting microwave energy to the entire chamber of an aftertreatment device provides the ability to rapidly increase the temperature of the chamber during cold start or low load conditions. This decreases catalyst warmup time, resulting in lower emissions.

For distributing microwave energy into the entire chamber, an optimal antenna location and antenna intrusion depth can be selected to use one single antenna to radiate microwaves into and cover the entire interior of the chamber. Alternatively, multiple antennae could be used to cover the entire interior of the chamber.

Figure 5:
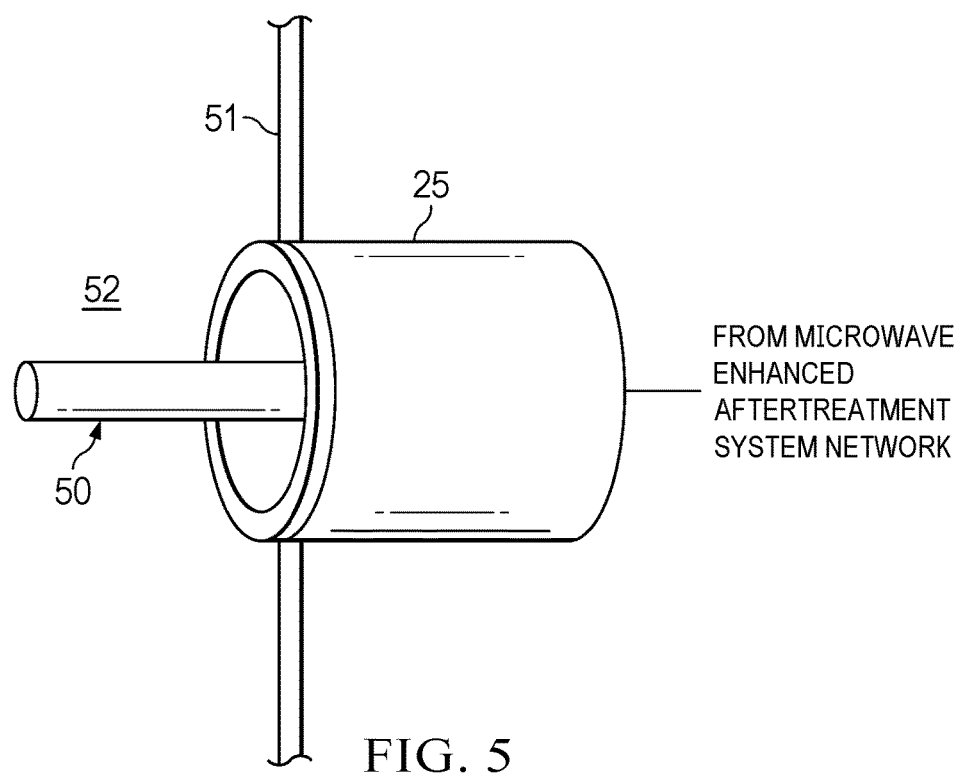
FIGS. 5 and 6 illustrate two examples of solid antennas, extending through the housing of an aftertreatment device and into a chamber.
Figure 6:
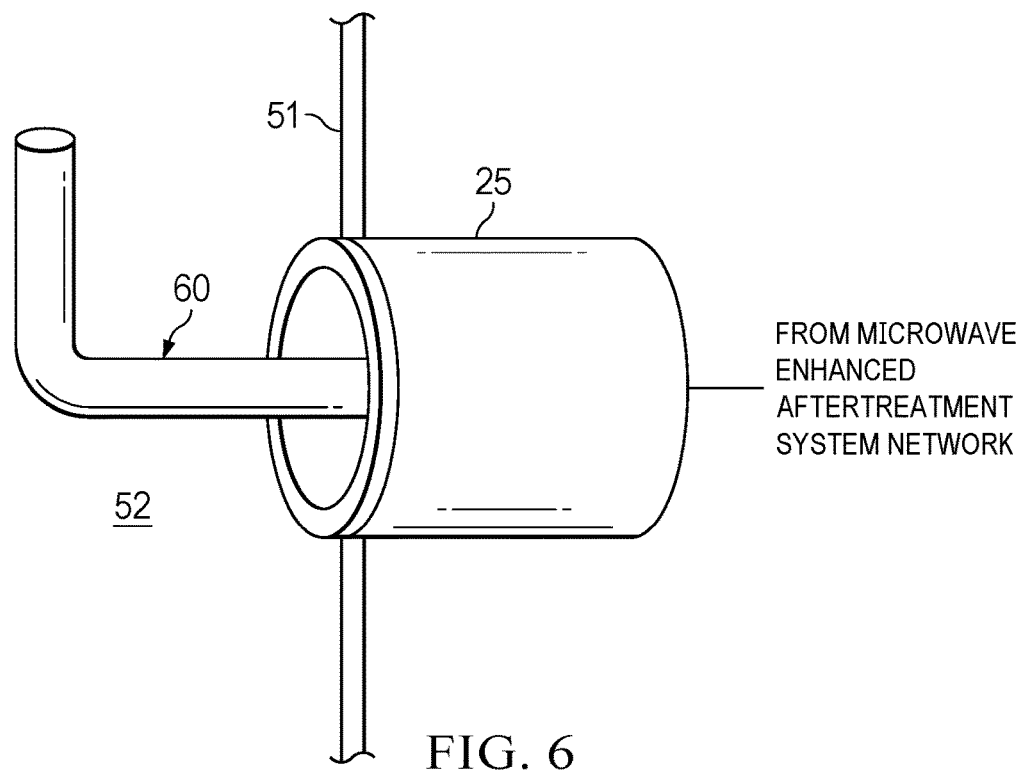

FIGS. 5 and 6 illustrate two examples of solid antennas 50 and 60, extending through the housing 51 of an aftertreatment device and into a chamber 52. In this case, the antenna is a "wire" antenna, and the wire antenna may be a metal conductor, such as copper. The wire may be bent perpendicular to the interior surface of the chamber wall as in FIG. 5 or may be parallel to the interior surface as in FIG. 6. Antennas 50 and 60 may easily be used in multiple with in a chamber. Solid antennas may also be made from ceramics.

Figure 7:
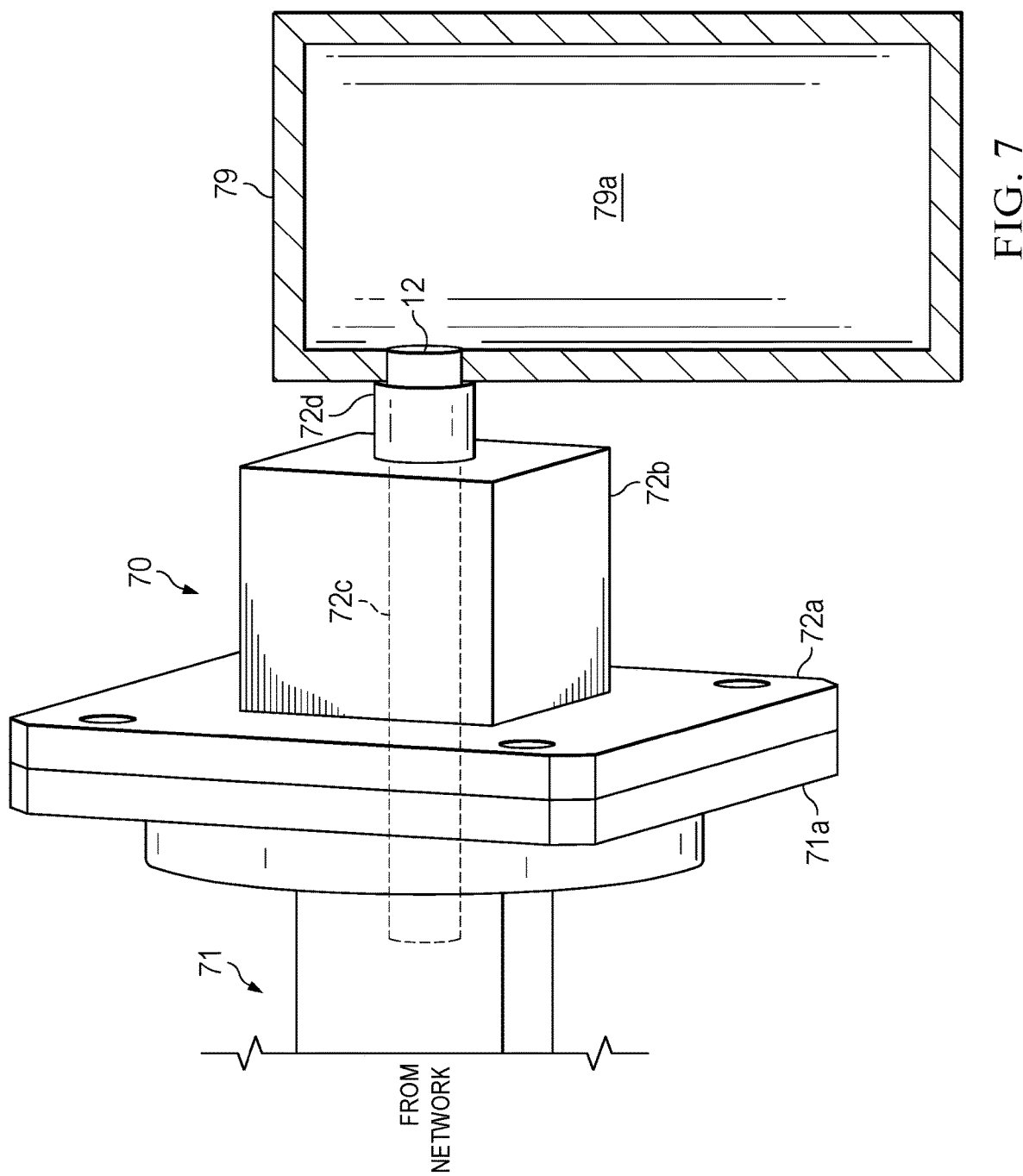
FIG. 7 illustrates an example of a microwave transition and antenna suitable for use with the MEA system.

FIG. 7 illustrates a waveguide transition 70, between a hollow waveguide 71 and solid antenna 12. This transition is described in U.S. patent application Ser. No. 17/587,977, to D. Moore and Y. Luo, entitled "Microwave Transition Device for Transitions from Air-Filled Waveguide to Solid Waveguide with Radiating Aperture Antenna", and assigned to Southwest Research Institute. This patent application is incorporated by reference herein. This type of transition 70 is particularly suited for MEA system 10.

FIG. 7 is not to scale; in practice waveguide 71, transition 70, and antenna 12 are much smaller relative to the aftertreatment device 79.

In FIG. 7, antenna 12 is a radiating aperture antenna that broadcasts microwave energy into the chamber 79a of an aftertreatment device 79. The antenna 12 is made from ceramic or other material able to withstand chemical conditions at high temperatures. Being an "aperture" antenna, antenna 12 may be substantially flush with the inner surface of the chamber 79a. More than one transition 70 and antenna 12 may be used for the device 79.

In other embodiments, antenna 12 may be a solid antenna, made from wire or ceramic. As distinguished from an "aperture" antenna, a solid antenna may extend into the chamber, such as in FIGS. 5 and 6.

Transition 70 comprises an attachment flange 72a, a housing 72b, and a ceramic rod 72c. Attachment flange 10a is "compatible to" an attachment flange 71a of waveguide 71, meaning that it is shaped and sized to provide a tight connection to flange 71a and has a central waveguide opening. When attached, the flanges provide a central air passage from waveguide 11 into housing 72b.

Rod 72c is a solid piece of high-dielectric material. A suitable material for rod 72c is ceramic, specifically, a low loss microwave dielectric ceramic. However, some other homogenous high dielectric constant material could be used.

Rod 72c extends below, through, and above the flanges and through housing 72b. The antenna 12 is implemented with a radiating aperture at an end of rod 72c. In other words, only the end face of rod 72c radiates microwave energy.

Support housing 72b is a rigid structure that surrounds some or all of the upper portion of rod 72c. It may be made from a material designed to withstand harsh environments, such as a ceramic.

A lower portion of rod 72c extends into waveguide 11. The portion of rod 72c that extends into waveguide 11 functions as a matching transformer between the air-filled waveguide mode of waveguide 71 and the solid cylindrical waveguide mode of antenna 12.

The upper portion of rod 72c is metal plated. As a result, the metal plating contains a cylindrical waveguide mode within rod 72c within cylindrical boundaries. These plated portions of rod 72c result in rod 72c functioning as a cylindrical solid waveguide with a radiating aperture antenna. On the lower portion of rod 10c, which extends into waveguide 71 there is no such plating. The end faces of rod 72c are not plated.

Optionally, to prevent breakage or fracture of rod 72c, a sleeve 72d may be attached to housing 72b, in which case, rod 72c is inserted through the sleeve. An appropriate material for such a sleeve is brass.

Operation

Referring again to FIG. 1, the location of MEA system 10 can be flexible, and may be based on the location of devices to which microwaves are delivered. Examples of typical installation locations are at the exhaust manifold or within the exhaust aftertreatment system. In the latter case, the MEA system 10 is proximate to at least one of the aftertreatment devices so as to be exposed to exhaust heat and chemical composition as well as to any reactions produced by the device. As stated above, the MEA system, being designed to withstand high temperatures and chemicals, may be located in the engine or near aftertreatment devices.

In operation, the MEA system enhances desired reactions within the aftertreatment devices. Enhanced chemical efficiency allows the use of a smaller and cheaper aftertreatment system. Aftertreatment emissions standards are met over a larger operating range resulting in less greenhouse gas emissions during the lifetime of the engine.

When the MEA system is used for heating purposes, it decreases the total amount of greenhouse gas emissions through a reduction in catalyst warm up time after an engine start event. For hybrid vehicles, heating may be provided at a battery propulsion event while the engine is fully stopped or outputting a low load.

Microwaves for Enhanced Combustion and Enhanced Aftertreatment

Figure 8:
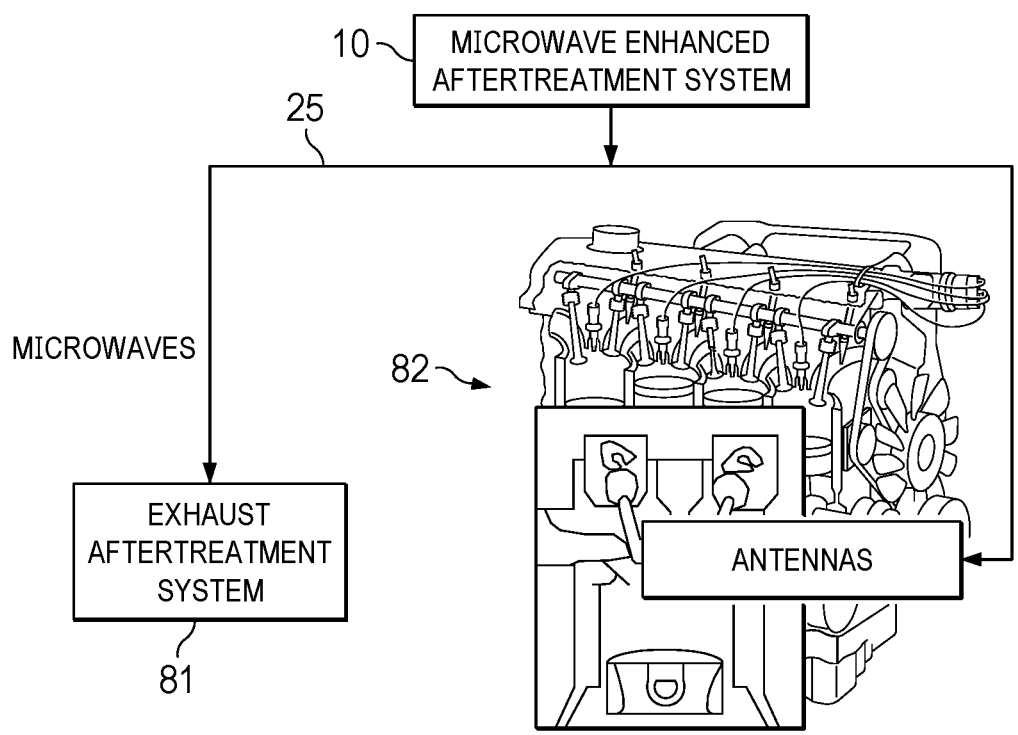
FIG. 8 illustrates an NEA system used to enhance both exhaust aftertreatment and piston cylinder combustion in an internal combustion engine.

FIG. 8 illustrates an on-board MEA system 10 used to enhance both exhaust aftertreatment and piston cylinder combustion in an internal combustion engine. The microwave transmission network 25 has hollow and/or solid waveguides and appropriate transitions to transmit microwaves to antennas.

The exhaust aftertreatment system 81 comprises one or more exhaust aftertreatment devices, such as discussed above, and enhances exhaust aftertreatment as discussed above.

Engine 82 has reciprocating cylinders, each having a combustion chamber. At least one cylinder is equipped with a microwave antenna 26 to enhance combustion, such as by assisting ignition or providing heating. An example of this use of microwaves is described in U.S. Pat. No. 11,174,780, to G. Conway and Y. Luo, entitled "Microwave Heating of Combustion Chamber of Internal Combustion Engine", assigned to Southwest Research Institute and incorporated by reference here.

A location of MEA system 10 near the combustion cylinders may be suitable when microwave energy is also to be delivered to the combustion cylinders to improve combustion. A particular use of microwaves is during cylinder deactivation events for vehicles equipped for a cylinder deactivation strategy. The same microwave generator may be used for both a microwave enhanced ignition or combustion system and microwave enhanced exhaust aftertreatment.

What is claimed is:

1. A system for providing microwave energy to one or more aftertreatment devices that treat the exhaust of an internal combustion engine, the one or more aftertreatment device having a treatment chamber, comprising:
    a microwave generator operable to generate microwaves at frequencies up to 12 gigahertz;
    a microwave transmission network for delivering the microwaves to one or more of the aftertreatment devices;
    wherein the microwave transmission network comprises a combination of solid and hollow waveguides;
    at least one solid antenna for transmitting microwave energy into a chamber of each of the one or more of the aftertreatment devices;
    a transition for transitioning the microwaves from a hollow waveguide of the microwave transmission network to the solid antenna, the transition having at least a rod having an upper portion extending in one direction from the hollow waveguide and a lower portion extending in the opposite direction into the hollow waveguide, the rod being made from a solid piece of high-dielectric material; wherein outer surfaces of the upper portion (other than its end face) are metal plated, such that the upper portion provides a solid waveguide extending to the chamber and to the solid antenna; and wherein the lower portion of the rod has no such plating; and a housing that surrounds the rod between the hollow waveguide and the aftertreatment device.

2. The system of claim 1, wherein the internal combustion engine is a diesel engine, and the aftertreatment devices are one or more of the following:
    a diesel oxidation catalyst, a particulate filter, a selective reduction catalyst, or an ammonia slip catalyst.

3. The system of claim 1, wherein the internal combustion engine is a spark ignition engine, and the aftertreatment devices are one or more of the following: a three-way catalyst or a particulate filter.

4. The system of claim 1, wherein the at least one antenna is a radiating aperture antenna.

5. The system of claim 1, wherein the microwave generator generates microwave power up to 10 kilowatts, and the microwave transmission network and the at least one antenna are capable of delivering microwave power up to 10 kilowatts.

6. The system of claim 1, wherein the at least one antenna is made from a ceramic material.

7. The system of claim 1, further comprising a controller operable to control the timing and duration of the microwaves.

8. The system of claim 1, wherein the microwaves are delivered to multiple aftertreatment devices, and the controller further controls when and which of the multiple aftertreatment devices receive microwaves and the frequency and/or power of microwaves delivered to each of the multiple aftertreatment devices.

9. A method of providing microwave energy to aftertreatment devices that treat the exhaust of an internal combustion engine, comprising:
    using a microwave generator to generate microwaves at frequencies up to 12 gigahertz;
    using a microwave transmission network to deliver the microwaves to one or more of the aftertreatment devices;
    wherein the microwave transmission network comprises a combination of solid and hollow waveguides;
    using at least one antenna to transmit microwave energy into a chamber of each of the one or more of the aftertreatment devices;
    transitioning the microwaves from a hollow waveguide of the microwave transmission network to the solid antenna using a transition having at least a rod having an upper portion extending in one direction from the hollow waveguide and a lower portion extending in the opposite direction into the hollow waveguide, the rod being made from a solid piece of high-dielectric material; wherein outer surfaces of the upper portion (other than its end face) are metal plated, such that the upper portion provides a solid waveguide extending to the chamber and to the solid antenna; and wherein the lower portion of the rod has no such plating; and a housing that surrounds the rod between the hollow waveguide and the aftertreatment device;
    wherein at least one of the aftertreatment devices has one or more antennas that distribute the microwaves throughout the chamber; and
    activating the microwaves during operation of the one or more aftertreatment devices.

10. The method of claim 9, wherein microwaves are delivered to rapidly increase the temperature of the chamber during cold start or low load conditions.

11. The method of claim 9, wherein microwaves are delivered to multiple aftertreatment devices, and further comprising independently controlling the timing and duration of the microwaves independently for each of the multiple aftertreatment devices.

12. The method of claim 9, wherein the microwave generator generates microwave power up to 10 kilowatts, and the microwave transmission network and the at least one antenna are capable of delivering microwave power up to 10 kilowatts.

13. The method of claim 9, further comprising using a microwave generator of a microwave enhanced ignition or combustion system to generate the microwaves.

14. The method of claim 9, further comprising locating the microwave generator and the microwave transmission network proximate to the one or more aftertreatment devices so as to be exposed to exhaust heat and chemical composition.

* * * * *